United States Patent
McGinn et al.

(10) Patent No.: US 6,760,430 B2
(45) Date of Patent: Jul. 6, 2004

(54) SYSTEM AND METHOD FOR REDUCING POWER DISSIPATION IN LINE DRIVER CIRCUITS

(75) Inventors: Scott McGinn, Ashton (CA); Martin Bijman, Stittsville (CA)

(73) Assignee: Catena Networks, Inc., Redwood Shores, CA (US)

( * ) Notice: Subject to any disclaimer, the term of this patent is extended or adjusted under 35 U.S.C. 154(b) by 30 days.

(21) Appl. No.: 10/222,215

(22) Filed: Aug. 16, 2002

(65) Prior Publication Data

US 2003/0048002 A1 Mar. 13, 2003

(30) Foreign Application Priority Data

Aug. 16, 2001 (CA) .............................................. 2355398

(51) Int. Cl.⁷ .............................. H04M 3/00; G05F 1/40
(52) U.S. Cl. ...................................... 379/322; 323/271
(58) Field of Search ................................ 323/266, 267, 323/268, 271; 379/322, 323, 324, 377, 395.01, 399.01, 412, 413

(56) References Cited

U.S. PATENT DOCUMENTS

| | | | |
|---|---|---|---|
| 4,704,670 A | 11/1987 | Gradl et al. | |
| 5,523,868 A | * 6/1996 | Hawley | ........................ 398/38 |
| 5,596,637 A | 1/1997 | Pasetti et al. | |
| 5,737,411 A | 4/1998 | Apfel et al. | |
| 5,754,644 A | 5/1998 | Akhteruzzaman | |
| 5,764,734 A | * 6/1998 | Medendorp et al. | |
| 5,815,569 A | 9/1998 | Akhteruzzaman | |
| 5,822,426 A | 10/1998 | Rasmus et al. | |
| 5,960,075 A | 9/1999 | Sutherland et al. | |
| 6,084,783 A | 7/2000 | Rascon Martinez et al. | |
| 6,167,134 A | 12/2000 | Scott et al. | |
| 6,351,534 B1 | * 2/2002 | Phillips | ...................... 379/413 |

* cited by examiner

*Primary Examiner*—Matthew V. Nguyen
(74) *Attorney, Agent, or Firm*—Townsend and Townsend and Crew LLP; Kenneth R. Allen

(57) ABSTRACT

A system reduces power dissipation for a plurality of line driver circuits. The system comprises a power source for providing a voltage source for the plurality of line driver circuits and a voltage regulator coupled between the power source and the plurality of line driver circuits. The voltage regulator receives an output of the power source and provides a constant predefined voltage to an input of the plurality of line driver circuits. Having a constant predefined voltage input to the plurality of line driver circuits reduces their average power dissipation.

23 Claims, 1 Drawing Sheet

SYSTEM AND METHOD FOR REDUCING POWER DISSIPATION IN LINE DRIVER CIRCUITS

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates generally to the field of power distribution systems for telecommunication networks and specifically to a system and method for reducing power dissipation by regulating voltage supplied to multiple telephone line driver circuits.

In a plain old telephone service (POTS) system, the central office (CO) is typically equipped with racks of shelves containing multiple line interface circuits or line driver circuits (LDs). Each of these circuits is connected to drive a telephone line or loop, the other end of which ultimately connects with subscriber telephone equipment. A power supply voltage applied to the LDs at the CO typically has a wide range. It may vary from a level representing the minimum value required to provide service, to a maximum that can be significantly higher. Voltage in excess of an optimum value is either applied to the telephone loop or, more often, dropped across the LD. Either way, this excess voltage is generally dissipated as heat and represents lost power from the supply. With increased demand to deliver a higher number of POTS LDs in a smaller shelf space, there is a corresponding need to reduce the power dissipation of these LDs to avoid both overheating and unnecessary power loss.

For a typical twisted-pair copper subscriber loop, the direct current (DC) electrical characteristics of the loop are specified by industry standards, and lie within defined ranges. In order to provide continuing telephone service in the event of an alternating current (AC) mains power failure, batteries are often provided at the CO for backup. The minimum battery voltage that is required to provide service within industry specifications depends on the LD circuitry. For a typical LD card servicing a subscriber loop, the minimum Tip to Ring voltage requirement at the LD output terminals is approximately 39 VDC on the longest loops, but may be lower for shorter loops as will be appreciated by a person skilled in the art. A corresponding voltage range for CO batteries in POTS applications generally ranges between 42 and 65 VDC.

As an alternative to batteries, some multi-line POTS applications use a DC power supply to deliver an equivalent to battery voltage. In such cases, the output voltage fluctuation or regulation of these DC power supplies is generally less stringent than for other, non-POTS applications. This reduced regulation allows the voltage input to the LDs to vary considerably, allowing for a corresponding voltage variation at the output terminals of the LDs.

As previously mentioned, battery voltage in excess of that required by a LD to provide an industry standard level of service may be applied either directly to the loop resulting in higher power dissipation within the loop, or across the LD. Thus, as voltage fluctuates above the required level, there is excessive power dissipation. One solution to address this power dissipation problem is to limit the current that is delivered to each loop on a loop-by-loop basis. As a result of this current limiting function, excess battery voltage is not dropped in the loop. However, a portion of the excess battery voltage continues to be dropped across the LD.

The following are some prior art attempts to reduce the power dissipation. U.S. Pat. No. 5,754,644 (Akhteruzzaman) describes a method for controlling power losses associated with the operation of LDs. For each LD, a detected loop current is used to access a threshold voltage value from a database. A threshold voltage based on the threshold voltage value retrieved from the database is compared to a feedback voltage for controlling the duty cycle of a switching converter circuit in the LD. Controlling the duty cycle of this switching converter circuit enables control of battery voltages based on the comparison of the threshold voltage and the feedback voltage. The battery voltage for each LD is then set at the minimum voltage needed to provide the required loop current. Similarly, U.S. Pat. No. 5,737,411 (Apfel et al.) describes a system wherein the LD for a given loop selects between two battery voltages to be applied to the loop depending on the status of the loop, for example either on or off hook. Comparable systems and methods for reducing power losses on an individual LD or loop basis are described in U.S. Pat. Nos. 5,960,075 (Sutherland et al.), 5,815,569 (Akhteruzzaman), 5,596,637 (Pasetti et al.), and 4,704,670 (Gradl et al.).

However, the systems described by the patents listed above can be complex and relatively expensive to implement. Further, the systems consume area on a line card, of which there is typically little to spare. Therefore, it is an object of the present invention to provide a system and method for reducing power dissipation in line drivers that obviates or mitigates the above mentioned disadvantages.

BRIEF SUMMARY OF THE INVENTION

In accordance with an aspect of the invention, there is provided a system for reducing power dissipation in a plurality of line driver circuits. The system comprises a power source for providing a voltage source for the plurality of line driver circuits and a voltage regulator coupled between the power source and the plurality of line driver circuits. The voltage regulator receives an output of the power source and provides a constant predefined voltage to an input of the plurality of line driver circuits. Having a constant predefined voltage input to the plurality of line driver circuits reduces their average power dissipation.

In accordance with another aspect of the invention, a method of reducing power dissipation in telecommunication networks is provided. The method includes interposing of a single highly efficient voltage regulator between the battery or power supply and multiple LDs components of the telecommunication network's power distribution system. When the voltage regulator is used rather than or in addition to voltage regulator circuitry in each LD, the power dissipation in both the LDs and the power distribution system may be reduced.

BRIEF DESCRIPTION OF THE DRAWINGS

An embodiment of the present invention will now be described by way of example only, with reference to the following drawings in which.

DETAILED DESCRIPTION OF THE INVENTION

Figure 1:
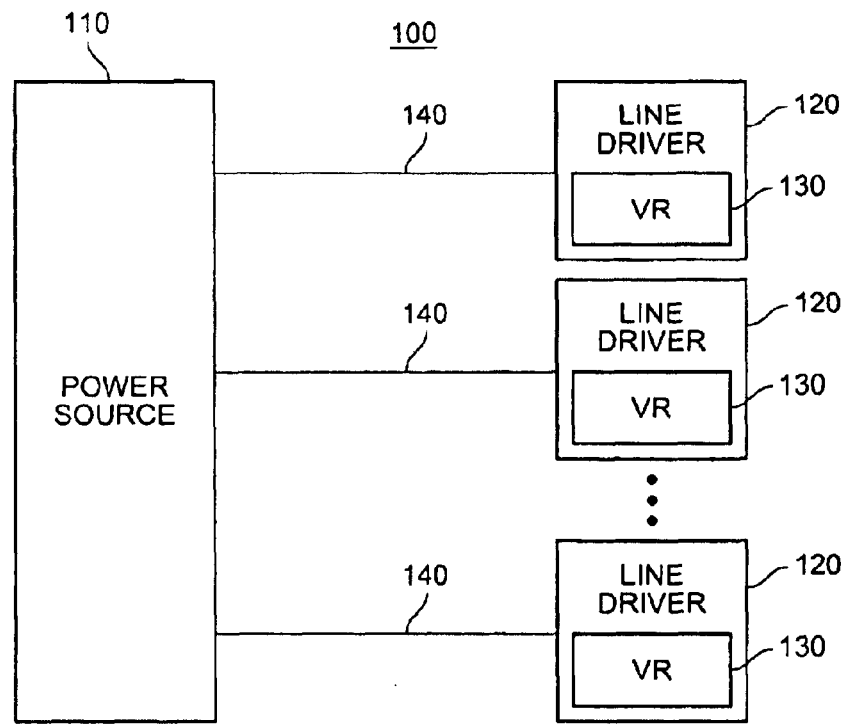
FIG. 1 is a block diagram of a typical power distribution system according to the prior art.

For convenience, like numerals in the description refers to like structures in the drawings. The term power distribution system is used herein to refer to any apparatus for distributing electrical power in telecommunication networks, including the AC and DC battery and power supply sources described herein.

Referring to FIG. 1, a block diagram of a typical, prior art, power distribution system is illustrated generally by numeral 100. The power distribution system 100 has a power source 110, which may be a DC battery or power supply, for supplying power to multiple line driver (LD) circuits 120. Each of the LD circuits 120 typically includes a voltage regulator 130. The power source 110 is coupled with each LD by conductors 140. The power source usually operates in a voltage range determined by the requirements of the line driver circuits. Excess voltage applied to the line driver is normally dissipated as heat in the voltage regulator and across the loop.

Figure 2:
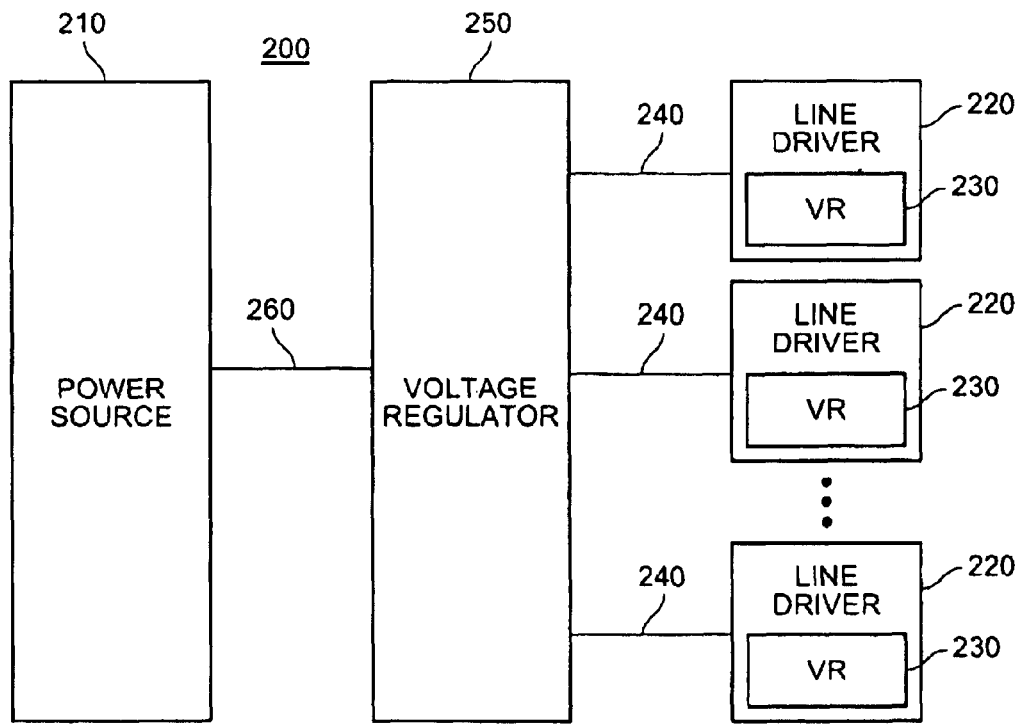
FIG. 2 is a block diagram of a power distribution system in accordance with a preferred embodiment.

Referring to FIG. 2, a block diagram of a power distribution system in accordance with an embodiment of the present invention is illustrated generally by numeral 200. The power distribution system 200 has a power source 210, which may be a battery or power supply, and multiple LDs 220. The LDs may or may not each include a voltage regulator 230. Additionally, the power distribution system 200 includes a highly efficient voltage regulator 250 that is interposed between the power source 210 and the LDs 220. The power source 210 is connected to the voltage regulator 250 by conductors 260. The regulator 250 is in turn connected to each LD by conductors 240. The multiple LDs 220 may be installed, for example, in a shelf in a channel bank rack within the CO. The regulator 250 may be installed, for example, on a per-shelf or per-channel bank rack basis. The outputs of the LDs 220 are coupled to subscriber loops (not shown).

The voltage regulator 250 maintains the voltage from the power source at a minimum value required for industry standard LD operation. In the present embodiment, the voltage level presented by the voltage regulator 250 to the input of each LD 220 via conductors 240 is set at an optimum voltage such that it meets all LD specifications and minimizes LD power. This voltage reduction virtually eliminates power dissipation in the LDs 220 that is in excess of that required for standard LD operation. Thus, the addition of the voltage regulator 250 typically causes a reduction of the average power dissipated within the LDs 220. The LDs 220 output voltage to their corresponding subscriber loops (not shown) is typically 39 VDC for the longest loops. Voltage levels for other loop lengths will be apparent to a person skilled in the art. The output voltage of the voltage regulator 250 is set to an optimum voltage level required by the system to provide the necessary loop voltages, as will be appreciated by a person skilled in the art.

Where the power source 210 is a battery, the regulator 250 is optimized for efficiency, linearity, and low noise. The regulator 250 may use either switching or voltage-to-voltage converter technology.

Where the power source 210 is an electric power supply, the voltage regulator 250 may be a separate device or it may form part of the power supply. The power supply may include an AC to DC converter, may form part of the CO's uninterruptable power supply (UPS), or may include an input from the CO's battery. In the event of failure of the AC mains to the CO, the power supply preferably includes a provision to switch from the AC supply to the DC supply available from the CO's battery. This "fail-over" ability may be provided by the CO's UPS.

The use of a voltage regulator 250 interposed between the multiple LDs 220 and the CO's power source 210 in lieu of, or in addition to, voltage regulator circuitry in each LD 220 allows the average power dissipation in the power distribution system 200 to be reduced. This is accomplished by the voltage regulator's 250 stabilization of the power source 210 voltage and by the provision of this stable and reduced voltage to the LDs 220. It is an advantage of the present embodiment that through the use of the voltage regulator 250, alternate and less efficient means of reducing the input voltage at the LDs 220 themselves, such as resistors for example, are no longer required. Specifically, the power dissipation in the voltage regulator 250 is generally less than that which would occur in the LDs 220 using passive dissipation techniques typical of the prior art.

The are a number of further advantages to using the present invention. First, the overall system delivers shelf or channel bank solution is simplified, in that a single point of regulation is much less expensive on a per-line basis. The circuits for a single point of regulation can be engineered for reliability, low noise, high efficiency, and are easier to protect against faults as compared to power reduction circuits that are implemented on a per-line basis. Typically, per-line power reduction circuits are built in high volume and thus are constrained by cost and density, resulting in circuits that are noisy, and less reliable due to the high number of overall system components. Second, with a tighter control of the battery voltage provided to the individual LDs, the design constraints for the individual LDs are less varied, making their design less complex, therefore more reliable and less costly.

Although the invention has been described with reference to certain specific embodiments, various modifications thereof will be apparent to those skilled in the art without departing from the spirit and scope of the invention as outlined in the claims appended hereto.

What is claimed is:

1. A system for reducing power dissipation in a plurality of line driver circuits comprising:
   (a) a power source for providing a voltage source for said plurality of line driver circuits; and
   (b) a voltage regulator coupled between said power source and said plurality of line driver circuits for receiving an output of said power source and providing a constant predefined voltage to corresponding inputs of said plurality of line driver circuits;
   wherein having said constant predefined voltage input to said plurality of line driver circuits reduces their average power dissipation.

2. The system of claim 1, wherein said constant predefined voltage is set to a value that satisfies minimum requirements of each of said plurality of line driver circuits.

3. The system of claim 2 wherein said constant predefined voltage ranges between 39 VDC and 72 VDC.

4. The system of claim 3 wherein said constant predefined voltage is selected to provide a voltage of 39 VDC at outputs of said line driver circuits.

5. The system of claim 1 wherein said voltage regulator comprises a voltage-to-voltage converter.

6. The system of claim 1 wherein said voltage regulator comprises switching technology.

7. The system of claim 1 wherein said power source is a battery.

8. The system of claim 1 wherein said power source is a power supply.

9. The system of claim 8 wherein said power supply includes AC to DC converter circuitry.

10. The system of claim 8 wherein said power supply includes said voltage regulator.

11. The system of claim 1 wherein said power source is an uninterruptable power supply (UPS).

12. The system of claim 1 wherein each of said plurality of line driver circuits includes voltage regulator circuitry.

13. A method for reducing power dissipation in a power distribution system for telecommunication networks, said power distribution system including a power source coupled to a plurality of line driver circuits, said method comprising the steps of:

(a) reducing and stabilizing a voltage provided by said power supply using a voltage regulator before supplying said voltage to said plurality of line driver circuits as a constant predefined voltage; and (b) presenting said constant predefined voltage to said line driver circuits thereby reducing power dissipation in said line driver circuits and in said power distribution system.

14. The method of claim 13 wherein said voltage of said voltage regulator is set at an optimum voltage that delivers all line driver specifications and minimizes line driver power.

15. The method of claim 14 wherein said voltage is variable between 39 VDC and 72 VDC.

16. The method of claim 15 and further comprising the step of selecting said output voltage of said voltage regulator to provide an output voltage at said line driver circuits of 39 VDC.

17. The method of claim 13 wherein said regulator is a voltage-to-voltage converter.

18. The method of claim 13 wherein said power source is a battery.

19. The method of claim 13 wherein said power source is a power supply.

20. The method of claim 19 wherein said power supply includes AC to DC converter circuitry.

21. The method of claim 20 wherein said power supply includes said voltage regulator.

22. The method of claim 13 wherein said power source is an uninterruptable power supply (UPS).

23. The method of claim 13 wherein said line driver circuits each contains voltage regulator circuitry.

\* \* \* \* \*